Aug. 11, 1931.  B. C. COONS  1,817,967

METHOD AND APPARATUS FOR CORING FRUIT

Filed Aug. 8, 1929  2 Sheets-Sheet 1

INVENTOR
Burton C. Coons
BY
his ATTORNEY

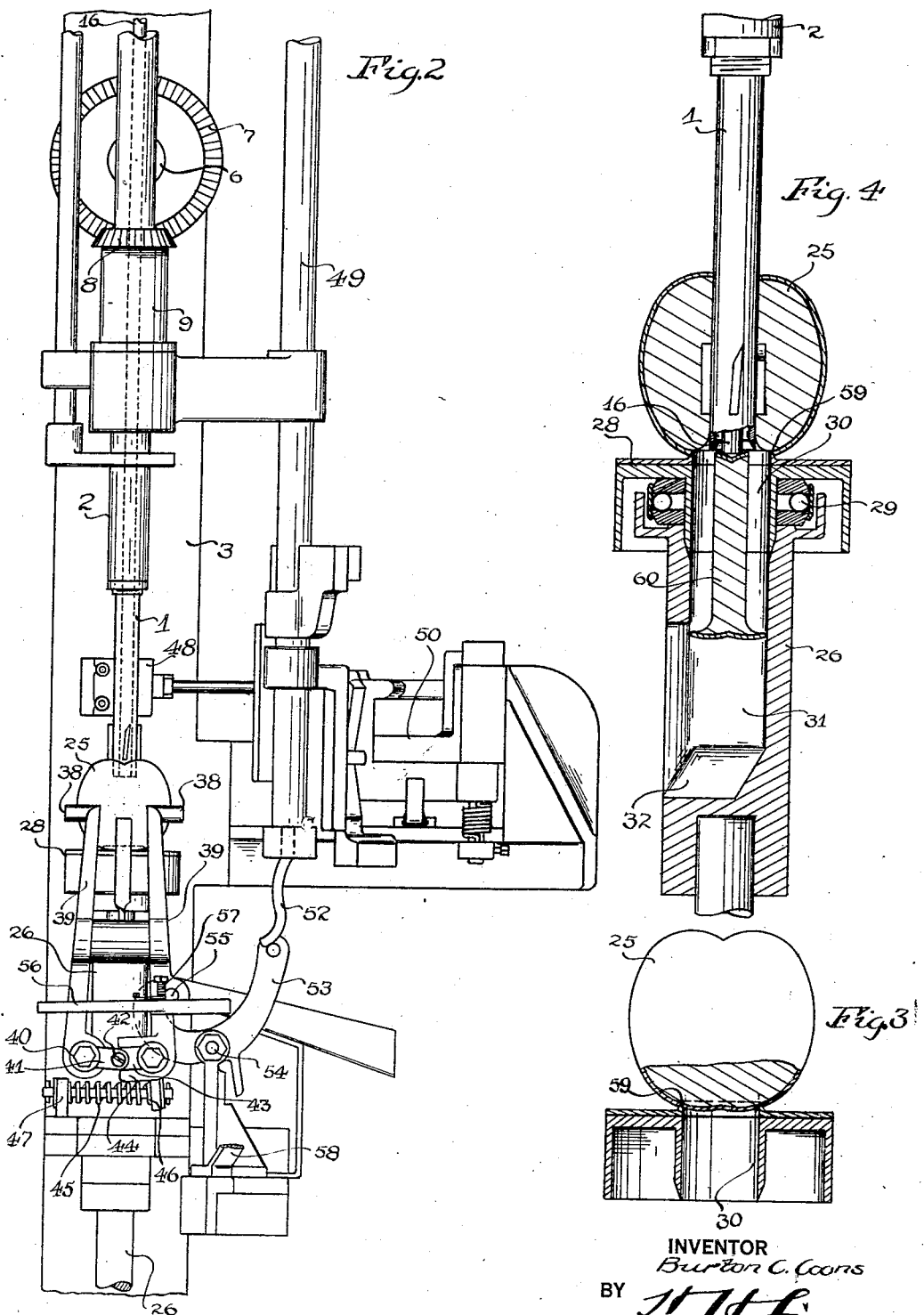

Patented Aug. 11, 1931

1,817,967

UNITED STATES PATENT OFFICE

BURTON C. COONS, OF ROCHESTER, NEW YORK, ASSIGNOR TO COONS MACHINERY CORPORATION, OF GATES, NEW YORK

METHOD AND APPARATUS FOR CORING FRUIT

Application filed August 8, 1929. Serial No. 384,383.

The present invention relates to a method of coring fruit and to a machine employing such method, an object of the invention being to provide for removing a portion of the skin or paring in proximity to one end of the core during the coring operation so that the waste and labor of hand trimming is eliminated. Another object of the invention is to cut an area in the skin of the fruit about one end of a proposed core larger than the proposed core and then coring from the end opposite the cut area so as to displace the cut area by the corer with the core. Still another object of the invention is to engage the fruit at one end with a circular cutter, of greater diameter than the corer, during a coring operation so that the coring operation will also remove the skin of the fruit in proximity to the core opening.

To these and other ends, the invention consists of certain parts and combinations of parts all of which will be hereinafter described; the novel features being pointed out in appended claims.

In the drawings:

Fig. 2 is the fragmentary front view of the same machine;

Fig. 3 is a fragmentary view of the fruit on a support on which the fruit is cored; and Fig. 4 is a fragmentary section showing the manner in which the fruit is cored.

Figure 1:
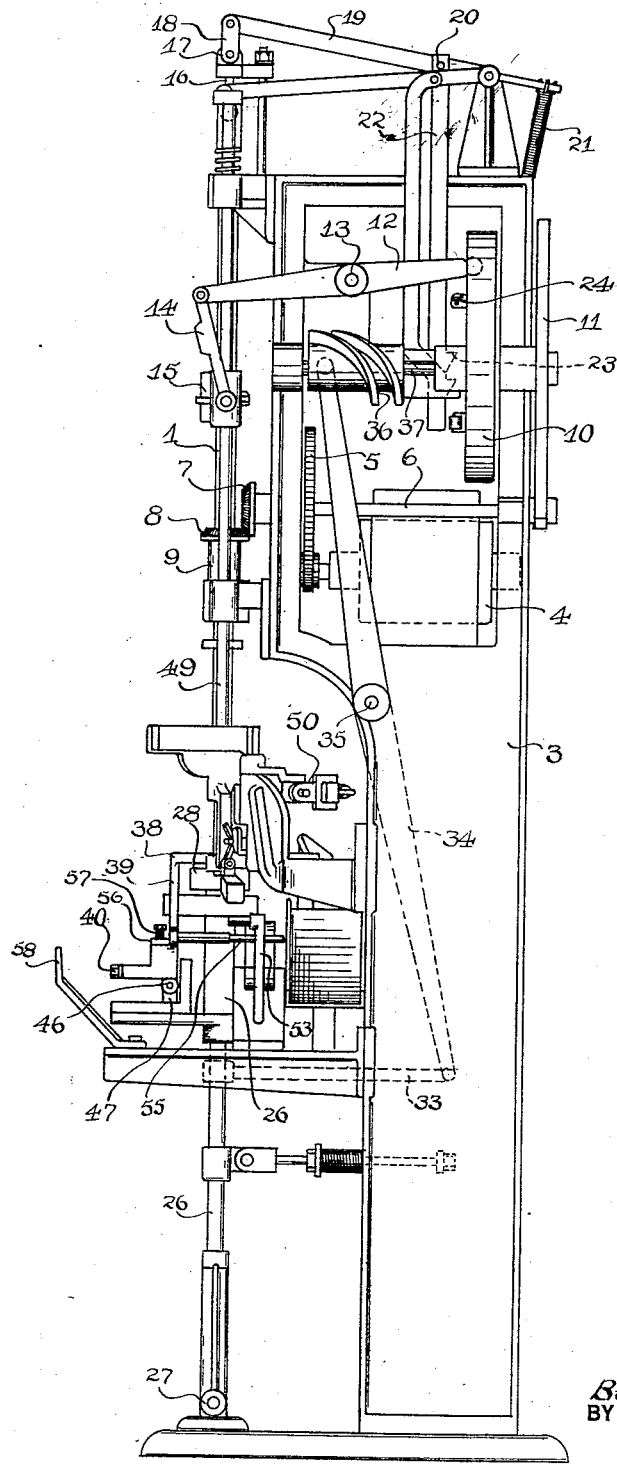
Fig. 1 is a side view of a paring machine embodying the present invention.

The invention is herein illustrated as embodied in a paring machine of the type illustrated in my application filed November 28, 1928, Serial No. 321,676, but it is apparent that it is not limited to this type of machine.

In this machine, the fruit is pared on a fruit supporting device 1 which is in the form of a tubular corer and is mounted on the lower end of a rotatable and axially movable carrier 2 supported vertically upon a frame 3. The carrier 2 is rotated, in this instance, by a motor 4 which by gearing 5 connects with a shaft 6. On the shaft 6 is bevel gear 7 meshing with a bevel gear 8 on a sleeve 9 which is mounted on the frame 3 against axial movement but which has a key connection with the carrier 2 causing the latter to turn therewith but permitting the axial movement of the carrier, axial movement of the carrier is effected, in this instance, through a cam 10 which through gearing 11 connects with the shaft 6 and through a lever 12 pivoted at 13 connects with a link 14. The latter is pivotally connected to a bracket 15 secured to the carrier 2.

Through the carrier 2 and through the corer 1 extends a core ejector 16 which has a swiveled connection 17 with a link 18 which is pivoted to a lever 19 in turn pivoted at 20 to the frame 3 and normally held in an elevated position by a spring 21. From the lever 19 depends a latch 22 which carries a shoulder 23 in the path of a projection 24 on the cam 20. The engagement of the shoulder 23 by the projection 24 depresses the core ejector after the coring operation and forces the core from the corer.

While the corer is moving upwardly the fruit 25 thereon is pared by a paring mechanism which, in this instance, is the same as that shown in my application above referred to and will not be described in detail herein. Except to state that the knife head 48 is swung in an arc about the fruit by means of a slide 49 which operates with the carrier 2 and also swings the frame 50 to carry the knife head away from the fruit to permit the latter to be pushed off the corer by the push off 51. The fruit is fed to the corer 1 by a feeding mechanism comprising, in this instance, a swinging member 26 pivoted at its lower end at 27 and having at its upper end a fruit rest 28 which is mounted to turn on the swinging member about an axis which will be coincident with the axis of turning of the corer. In this instance, a ball bearing 29 is interposed between the fruit rest and the swinging member 26. The fruit rest and the support have coincident openings 30 and 31 respectively the latter opening laterally at 32 at its lower end to provide a discharge passage for the cores. Movement of the swinging member may be effected by a link 33 pivoted to the swinging member 26 and to a lever 34 which is in turn pivoted at 35 to the frame of the machine and has its upper end operating on a cam 36 on the shaft 37 which also carries the cam 10. This mechanism swings the member 26 into and out of line with the carrier 2 so that fruit may be placed on the rest 28.

For holding the fruit on the rest, prior to its engagement by the corer, a holding means may be provided comprising, in this instance, two jaws 38 of V formation supported by two arms 39 which are pivoted at 40 on two different pivots. These are connected for simultaneous movement in opposite directions by an arm 41 on one arm 39 pivoted at 42 to a block 43 which slides in a way on an arm 44 projecting from the other arm 39. A spring 45 connected at 46 to one arm 39 and at the other end at 47 to the swinging member 26 serves to hold the jaws 38 normally separated. Movement of the jaws toward each other is effected, in this instance, by means of the slide 49 which controls the paring mechanism as described in my before mentioned application. The slide 49 carries at its lower end a cam 52 which engages one arm of a bell crank lever 53 pivoted at 54 to the main frame 3 and having its other arm engaging a pin 55 carried by one of the arms 39, the jaws being opened by the slide 49 about the time the corer 1 enters the fruit but before the corer has passed into the fruit for any considerable distance so that the fruit is free to turn with the corer without retardation by the jaws. The jaws are held open by a latch or detent 56 pivoted to one of the jaws and engaging the other, a spring 57 serving to hold the detent normally toward detaining position. As the carrier 26 swings outwardly with the jaws held open by the detent 56 a fruit is placed on the seat member 28 and the detent 56 is engaged by an abutment 58 on the frame 3 releasing the jaws to the action of the spring 45 and permitting them to close on the fruit and hold the fruit until it is released by the slide cam 52.

All of the foregoing mechanisms are substantially the same as those shown in my application for patent hereinbefore mentioned so that a detailed description of the parts and operation is unnecessary.

The feature of this invention is the coring of the fruit. As pointed out in my previous application, by supporting fruit such as an apple at one end on a rest over an opening and passing a corer through the fruit from the other end, the ejection of the core causes the fruit to break away at the supported end and thus eliminates the trimming of the fruit due to the paring knife not being able to pare in the depression without cutting away a large part of the fruit. In my previous application no means was provided for controlling this break and as a result, in some instances, it would be too much and others it would be too little. With this invention it is possible to control this break so as to insure a uniform break in all fruit. This is accomplished by providing about the opening 30 a cutter or knife 59 which will cut a circular area through the skin of the fruit about the depression at the supported end so that when the core 60 is pushed from the fruit the break will be at the point of least resistance as defined by the cutter or knife 59. It will be noted that in the illustrated embodiment the knife 59 due to the pressure of the corer 1 thereon in entering the fruit, passes into the fruit a distance substantially in a plane with the lower end of the corer 1 when the latter is at the lowest end of its movement, and while the parts are in these positions the core ejector operates to force the core from the fruit into the core discharge passages 30 and 31, thus insuring the breaking of the fruit between the lower end of the corer and the cutter or knife.

What I claim as my invention and desire to secure by Letters Patent is:

1. The method of coring fruit which comprises cutting the fruit in the direction of and about its core with two cuts from opposite ends, one of said cuts extending nearly through the fruit and the other extending only a slight distance into the fruit and of greater diameter than the longer cut, and forcing the cut core from the end of the fruit having the shorter cut to cause the fruit to break between the two cuts.

2. In a coring machine, the combination with a tubular corer for passing into one end of a fruit, of a cutter engaging the opposite end of the fruit, and means for operating the corer and the cutter to cause the cutter to penetrate the fruit to a point where the end of the corer is nearer but in spaced relation to the opposite end of the fruit, and to cause the cutter to produce a shorter cut to cut out an area in the skin at such end of greater diameter than the diameter of the corer.

3. In a coring machine, the combination with a tubular corer for passing into one end of a fruit, of a cutter engaging the opposite end of the fruit to cut out an area in the skin at such end of greater diameter than the diameter of the corer, and an ejector operating in the corer to force the core from the fruit while it is held by the cutter and the corer.

4. In a coring machine, the combination with a fruit rest having a central discharge opening and a cutter surrounding said discharge opening, of a tubular corer for engagement with the opposite end of a fruit on said rest, and an ejector passing through said tubular corer to force the core through the central opening of the rest.

5. In a coring machine, the combination with a rotary tubular corer, of a fruit rest rotatable about the axis of rotation of the corer and having a central core discharging opening, an annular cutter on the rest about the central opening, and a core ejector movable in the tubular corer to force the core through the central opening of the fruit rest.

BURTON C. COONS.